(12) United States Patent  (10) Patent No.: US 8,308,148 B2
Shand  (45) Date of Patent: Nov. 13, 2012

(54) PLUG-IN BODY MOUNT DAMPING DEVICE FOR VEHICLES

(75) Inventor: Mark A. Shand, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 977 days.

(21) Appl. No.: 11/756,140

(22) Filed: May 31, 2007

(65) Prior Publication Data

US 2008/0296852 A1 Dec. 4, 2008

(51) Int. Cl.
*F16F 13/00* (2006.01)

(52) U.S. Cl. .................. 267/140.13; 267/141.1

(58) Field of Classification Search .......... 267/219–220, 267/292–294, 141.1, 140.13, 141; 296/1.03; 403/348–349, 353; 180/291–292, 312
See application file for complete search history.

(56) References Cited

U.S. PATENT DOCUMENTS

| 5,330,166 A | 7/1994 | Aoki ............................... 267/220 |
| 5,529,295 A | 6/1996 | Leibach .................... 267/140.15 |
| 6,017,073 A | 1/2000 | Lindblom |
| 6,394,432 B1 | 5/2002 | Whiteford ................. 267/140.13 |
| 6,986,545 B2 | 1/2006 | Nilsson ...................... 296/190.07 |
| 7,036,803 B2 | 5/2006 | Maas ......................... 267/140.12 |
| 7,048,265 B2 | 5/2006 | Huprikar ..................... 267/141.1 |
| 2004/0262831 A1* | 12/2004 | Maeno et al. ............. 267/140.13 |

FOREIGN PATENT DOCUMENTS

| DE | 69201158 T2 | 11/1992 |
| GB | 69201158 | 5/1999 |
| GB | 19922800 | 11/1999 |
| GB | 2343665 | 5/2000 |
| JP | 62024048 A * | 2/1987 |

* cited by examiner

*Primary Examiner* — Robert A Siconolfi
*Assistant Examiner* — Anna Momper
(74) *Attorney, Agent, or Firm* — Frederick Owens Esq.; Miller Law Group, PLLC

(57) ABSTRACT

A plug-in hydraulic body to frame mounting assembly is mounted to a conventional elastomeric body mount device to increase the control of vibration from the operation of the automotive frame to the automotive component supported thereon. The connecting member of the hydraulic mounting assembly threads onto the end of the fastener passing through the conventional elastomeric body mount device and anchors the outer can to a bridging can connected to the underside of the frame offrigger bracket to provide a true plug-n-go vibration control enhancement that can be added to any desired body mount location. The deflection of the fastener during operation of the elastomeric body mount device drives the operation of the hydraulic mounting assembly to dampen the deflection of the fastener in the elastomeric body mount corresponding to the transfer of operational loads between the body component and the offrigger bracket to which the body component is mounted.

8 Claims, 3 Drawing Sheets

PLUG-IN BODY MOUNT DAMPING DEVICE FOR VEHICLES

FIELD OF THE INVENTION

This invention relates to the mounting of automotive body parts to a vehicle frame, and, more particularly, to an add-on hydraulic body mount device that can be coupled to an existing shear-style body mount to increase damping characteristics at desired locations on the vehicle frame.

BACKGROUND OF THE INVENTION

The body to frame mounting assembly is used to attach automotive body parts to a frame so that the two metal components do not directly contact one another, as a direct contact would provide a high degree of noise transmission from one component to another, as well as a direct transmission of vibration and other mechanical actions. Conventional body mount assemblies, compression or shear type, utilize multiple or single elastomeric members to isolate the frame from the automotive part to be mounted on the frame. Since both the frame and the automotive part are isolated from one another and from the fastener system joining them, the transmission of noise and vibration from the frame to the automotive part is minimized.

Controlling the design and material properties of typical body mounts, in reference to noise and vibration transmission to vehicle occupants, is only one, of many, paths that development engineering can take to address a total vehicle noise and vibration issue. Ultimately, the body mounting system is the direct transmission source of noise and vibration to the occupant compartment. Thus maintaining a body mount design that controls body movement and appropriately isolates the vehicle occupants from noise/vibration is challenging In the design of automotive vehicles, such as pick-up trucks, the final desired vehicle level ride and vibration tuning requirements are complex in that consideration must be given to the multiple wheel base, power train, cab style, and tire/wheel offerings. Proper selection of material and isolator dynamic/static rates for tunable parts; i.e., suspension bushings, power train mounts and the body mounts, is critical when balancing vehicle level ride and vibration performance. Tunable part characteristic selection is one path, of many, that the vehicle engineering development community uses in establishing vehicle level performance attributes. The selected tuning can require multiple parts to support the complex vehicle offerings. Accordingly, while trying to maintain manageable component quantity complexity at the manufacturing facility, some vehicle configurations may not be optimally tuned for the best vehicle level ride and vibration performance. Couple vehicle build variability with individual component assembly variability and an opportunity exists to build a vehicle with less-than-optimal ride and vibration characteristics. At this point in development, time to make component design changes, for production, has elapsed to zero; trying to add more component/system damping becomes increasingly difficult.

The addition of frame mounted tuned mass dampers, to reduce vehicle level vibration sensitivity to Body-on-Frame vehicles, by adding increased levels of system damping, traditionally requires design proveout due to a late discovered issue. The design/development proveout requires a substantial amount of time and manufacturing expense to implement. Furthermore, the addition of mass dampers is effective only in select spots on the vehicle and requires additional development. Since the addition of mass dampers is not planned, the implementation represents a significant amount of additional expense. Generally speaking, frame mounted tuned mass dampers are affective once implemented; however, cost, weight and vehicle assembly are detrimental to the design. As mentioned previously, the output of a tuned mass damper still does not apply the desired damping at the best location; at the body mount positions. As such, hydraulic body mounts have been utilized in automotive vehicles as a replacement for the conventional body mount. These hydraulic mounts now add to the additional body mount/part complexity and also must adhere to the performance criteria of a traditional body mount such as, durable against high vehicle loads associated with vehicle operation, which has resulted in a high failure rate.

U.S. Pat. No. 5,330,166, granted to Hirofumi Aoli on Jul. 19, 1994, discloses a conventional hydro mount having a tunable frequency range that is used for classic engine, body or suspension mounts to replace shear-type body mounts, instead of being used in addition thereto. U.S. Pat. No. 5,529,295, issued to Markus Leibach on Jun. 25, 1996, is directed to an engine mount isolator employing an electromagnetic fluid controlled device to improve the feedback mechanism for an active controlled engine mount system. In U.S. Pat. No. 6,394,432, granted on May 28, 2002, to Gerald Whiteford, a conventional hydro mount system is provided with a compensator device to make up for the inherent shortcomings of the classic hydro mount.

U.S. Pat. No. 6,986,545, issued on Jan. 17, 2006, to Ingemar Nilsson, teaches the use of two isolators; however, the isolators are not joined together. Instead, the two isolators are joined to the same subframe member, but no pumping action from one isolator affects the driving of the other isolator. Accordingly, the Nilsson patent does not disclose a plug-in damper that is supplemental to the operation of the conventional isolator. In U.S. Pat. No. 7,036,803, issued to Clayton Maas on May 2, 2006, discloses an engine hydraulic mounting system with a switchable valve to avoid bulging of the main elastomeric unit. A two-stage isolation mount assembly is disclosed in U.S. Pat. No. 7,048,265, issued on May 23, 2006, to Anand Huprikar, to take advantage of a soft spring rate with a low maximum displacement. In U.K. Patent No. 2,343,665, a hydraulically damped engine mounting arrangement having two load-bearing mounts and two tie bars is disclosed.

None of the known prior art references teach a hydraulic body mount device that can be attached to a conventional shear-type body to frame mounting assembly to provide a tunable vibration damping function in which the conventional body to frame mounting assembly absorbs the high vehicle loads while the plug-in hydraulic body mount provides a supplemental damping effect to the conventional body to frame mounting assembly.

SUMMARY OF THE INVENTION

It is an object of this invention to overcome the aforementioned disadvantages of the known prior art by providing a plug-in hydraulic body mount that can be attached to a conventional body mount to enhance damping effects.

It is another object of this invention to provide a tunable body to frame mounting assembly in which a hydraulic body mount is attached to a conventional shear-type body mount.

It is a feature of this invention that a body to frame mounting assembly is tunable to enhance operation in reducing vehicle vibrations and noise transmission by the placement of supplemental hydraulic body mounts at those locations needing additional vibration damping.

It is an advantage of this invention that the hydraulic body mount is not required to absorb the loading imposed on the body to frame mounting assembly by the operation of the vehicle.

It is another advantage of this invention that the lack of vehicle loading in the hydraulic body mount device improves the failure rate associated with hydraulic body mounts.

It is another feature of this invention that the hydraulic body mount is affixed to the end of the fastener passing through the conventional shear-type elastomeric body mount device.

It is still another advantage of this invention that the plug-in hydraulic body mount device meets vibrational tuning requirements relating to multiple configurations of vehicle component offerings without requiring multiple tunable parts in the manufacturing process.

It is still another feature of this invention that effectiveness of the vibration control assembly in lesser customer base configuration selections are not hindered by the tunable vibration control devices configured for the highest customer base configuration selection.

It is yet another feature of this invention that the hydraulic body mount can be directly applied to the body-on-frame mount to increase damping ability of the conventional body mount device.

It is yet another advantage of this invention that the combination of the hydraulic body mount device to a conventional elastomeric body mount apparatus increases the potential to reduce vehicle level shake/sensitivity due to multiple component offering configurations.

It is a further advantage that the use of a hydraulic body mount device affixed to a conventional elastomeric body mount improves the manufacturing process for automotive vehicles by improving flexibility with respect to multiple vehicle configurations.

It is still a further advantage of this invention that the non-load bearing hydraulic body mounts avoid the inherent operational variability found in conventionally operable load bearing hydraulic body mount assemblies.

It is a further feature of this invention that the use of the plug-in hydraulic body mounts provides an easily tunable system that can be adapted to unique sensitivities, such as tire/wheel balance and the complexities of the many tire/wheel, power train and wheelbase combinations.

It is yet a further advantage of this invention that the plug-in hydraulic body mount is capable of being mounted on existing elastomeric body mounts and frame brackets and doesn't require their modification.

It is still another object of this invention to provide a plug-in hydraulic body to frame mounting assembly for use in attaching automotive components to a vehicle frame that is durable in construction, inexpensive of manufacture, carefree of maintenance, facile in assemblage, and simple and effective in use.

It is yet another advantage of this invention to eliminate any frame mounted tuned mass absorbers/dampers.

These and other objects, features and advantages are accomplished according to the instant invention by providing a plug-in hydraulic body to frame mounting assembly that can be mounted to a conventional elastomeric body mount device to increase the control of vibration from the operation of the automotive frame to the automotive component supported thereon. The connecting member of the hydraulic body to frame mounting assembly threads onto the end of the fastener passing through the conventional elastomeric body mount device and anchors the outer can to a bridging can connected to the underside of the frame offrigger bracket to provide a true plug-n-go vibration control enhancement that can be added to any desired body mount location. The deflection of the fastener during operation of the elastomeric body mount device drives the operation of the hydraulic body to frame mounting assembly to dampen the deflection of the fastener in the elastomeric body mount corresponding to the transfer of operational loads between the body component and the offrigger bracket to which the body component is mounted.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
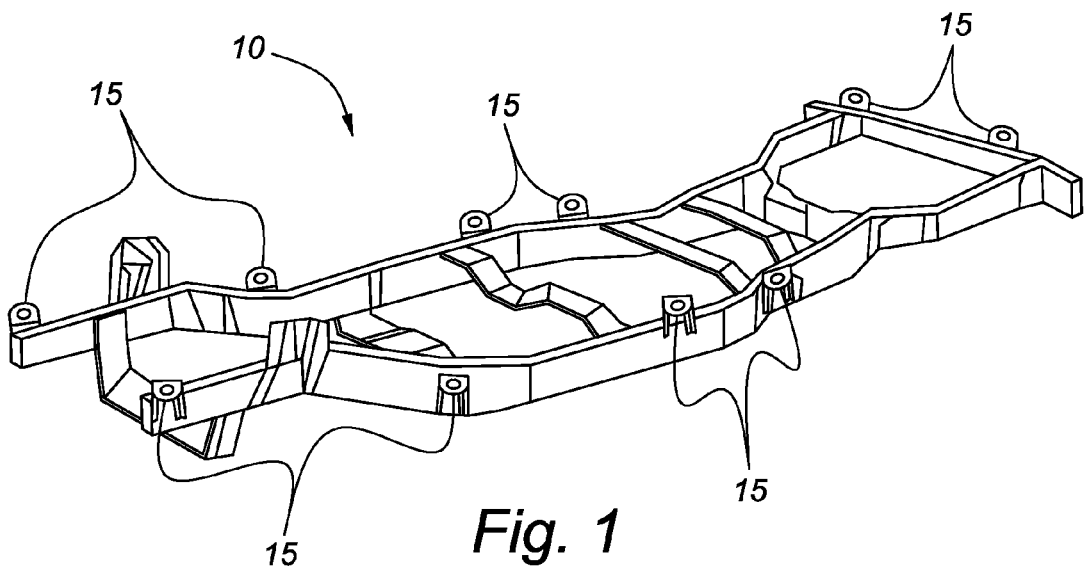
FIG. 1 is a perspective view of a representative vehicle frame having mounts for the attachment of automotive body components thereto.

Referring to the drawings, a vehicle frame containing offrigger brackets by which respective automotive parts and components, such as an underbody sheet metal floor pan cross member, are to be attached to the frame 10. The frame 10 is representative of automotive frames to which appropriate automotive body parts or components are to be attached by connecting the body part or component 19 to a frame offrigger bracket 15. As one of ordinary skill in the art will recognize, a vehicular frame 10 will be manufactured with a plurality of offrigger brackets 15 to secure the exterior sheet metal and other components 19 to the frame 10.

Instead of directly bolting the automotive component 19 to the frame by a bolt fastening the component 19 to the corresponding offrigger bracket 15, a substantial reduction of noise transmission from the road and other external sources through the frame 10 and mechanically transferred to the automotive component 19 can be accomplished by isolating the metal parts 10, 19 with an elastomeric material. In addition to a reduction in noise transmission, vehicle vibrations transmitted through the connecting joint are also significantly diminished.

This elastomeric joint has evolved into a body to frame mounting assembly in which an elastomeric member is connected to the vehicle body component 19. In some body mount configurations, a lower elastomeric member can be provided to provide a two-piece body mount with the lower elastomeric member being connected to the frame offrigger bracket with a fastener, such as an attachment bolt, being inserted through a central opening through the upper and lower members. The attachment bolt clamps the elastomeric member between the outrigger bracket and the corresponding body component and provides a resilient mounting for the respective body component. The isolation material is typically selected from the group comprising, butyl rubber, natural rubber and micro cellular urethane, among others.

Figure 2:
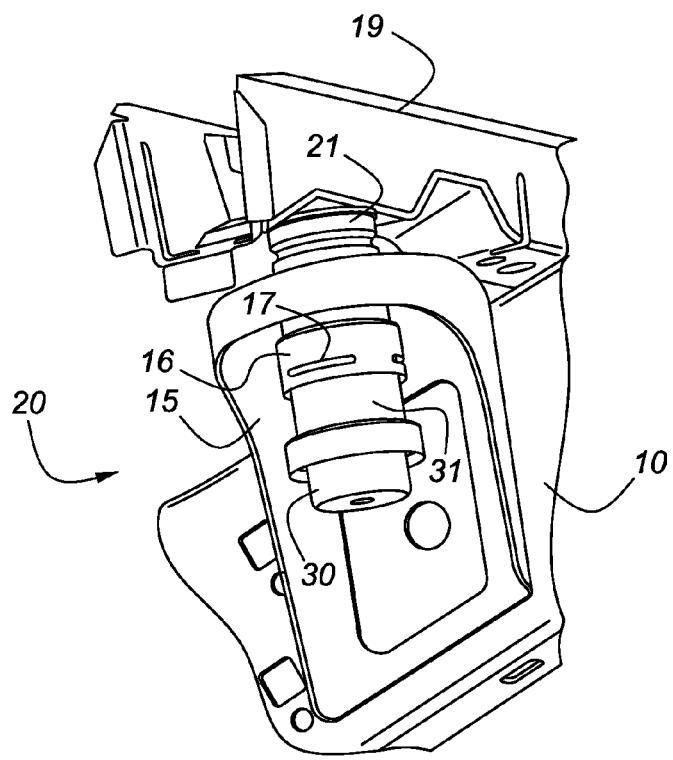
FIG. 2 is an enlarged perspective view of a vehicle frame body mount to which an automotive part is being attached by a combination hydraulic and elastomeric body to frame mounting assembly incorporating the principles of the instant invention.
Figure 3:
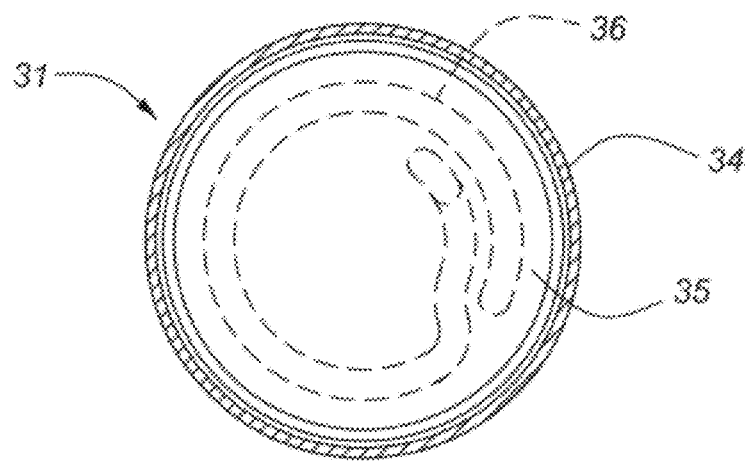
FIG. 3 is a cross-sectional view through the hydraulic plug-in body mount device taken along lines 3-3 of FIG. 4 to depict the channel within the central member through which fluid flows when driven from the upper chamber into the lower chamber by the deflection of the fastener on which the hydraulic body mount is attached.
Figure 4:
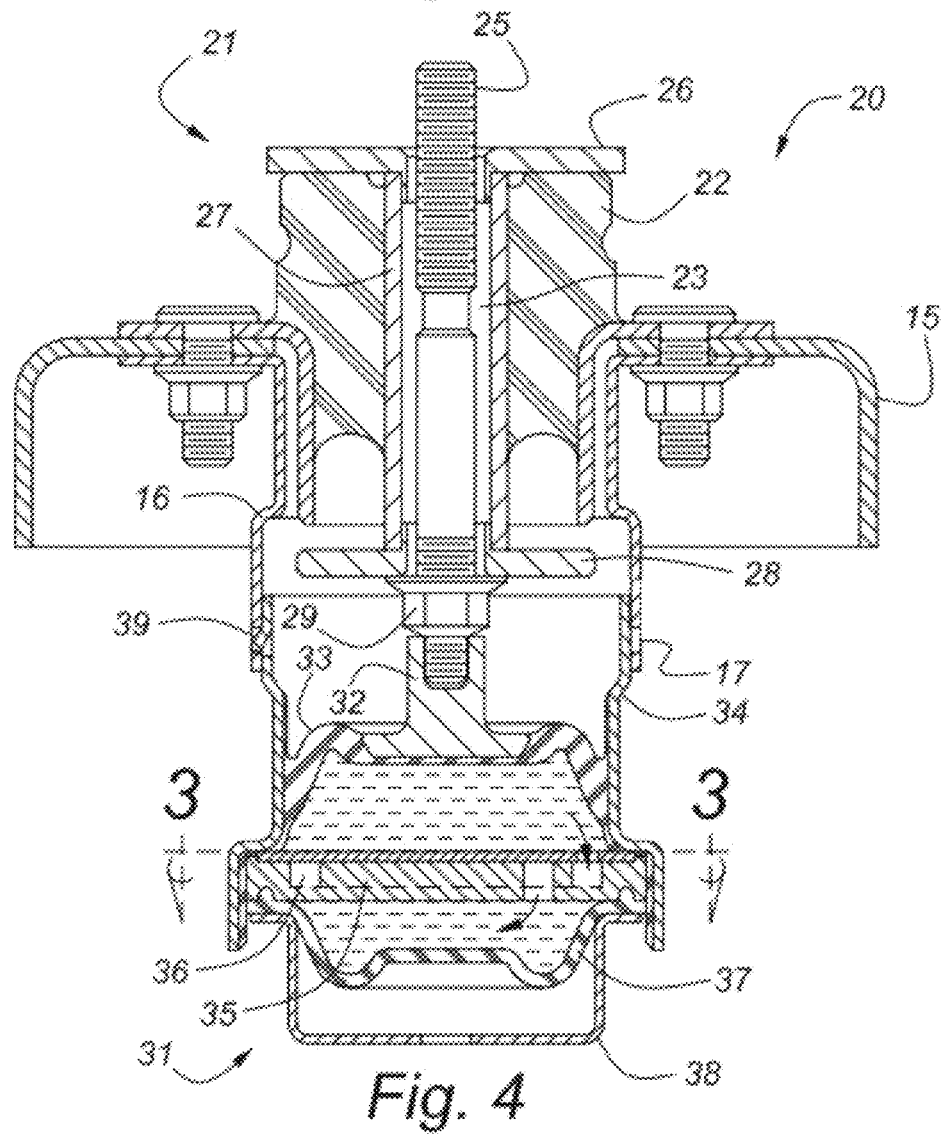
FIG. 4 is a cross sectional view of the combination hydraulic and elastomeric body to frame mounting assembly taken through the center of the body mount.
Figure 5:
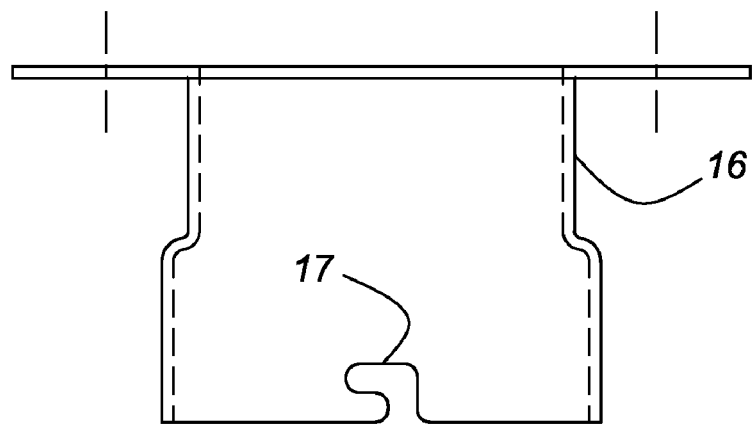
FIG. 5 is an elevational view of the hydraulic mount bridging can.
Figure 6:
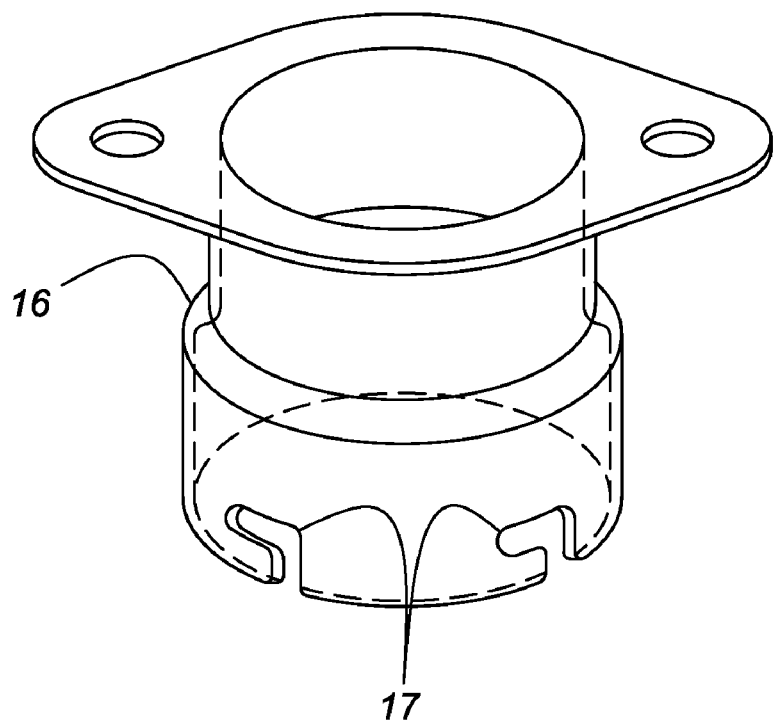
FIG. 6 is a perspective view of the hydraulic mount bridging can shown in FIG. 5.

Referring now to FIGS. 2-4, the body to frame mounting assembly 20 can best be seen. The conventional shear-type elastomeric body to frame mounting assembly 21 is formed with an elastomeric member 22 that isolates the component 19 from the frame 10. The elastomeric member 22 is formed with a central opening 23 extending therethrough to form a donut-like configuration through which an attachment bolt 25 passes. The automotive body part 19 to be mounted to the frame 10 is preferably formed to be engagable with the attachment bolt 25 and mated against the body mount top washer 26. A body mount inner tube 27 passing through the central opening 23 engages the body mount lower washer 28 such that a bolt head or a nut 29 engaged with the attachment bolt 25 compresses the body mount lower washer 28 against the tube 27 and the body mount top washer 26, which is engaged with the automotive component 19. The elastomeric member 22 isolates the body mount top washer 26 and the tube 27 from the offrigger bracket 15.

During normal operation, the elastomeric body mount 21 deflects as the operational loads are imposed on the frame 10 and the automotive component 19, compressing the elastomeric member 22 and driving the attachment bolt 25 up and down relative to the offrigger bracket 15. Thus, the loads transmitted between the offrigger bracket 15 on the frame 10 and the automotive component 19 pass through and are absorbed by the elastomeric body mount 21.

To further dampen the vibrations passing between the frame offrigger bracket 15 and the automotive component 19, the body to frame mounting assembly 20 further includes a supplemental hydraulic body mount 31 attached to the elastomeric body mount 21. The hydraulic body mount 31 is formed with a steel connecting member 32 secured to an upper chamber 33 of a main elastomeric spring element that also includes a lower chamber 37, which, in turn, is secured along the circumferential periphery thereof to a outer can 34. The outer can 34 also supports a central member 35 having a fluid orifice track 36 formed therein to provide a passage of fluid through the central member 35, and an lower chamber 37 of the main elastomeric spring element. A protective cap 38 is mounted on the lower chamber 37 to protect the main elastomeric spring element and provide room for the lower chamber 37 to expand.

The application of a hydraulic body mount 31 is determined by the desire to provide additional damping of vibration at any particular offrigger bracket 15. The primary vibration control is provided by the elastomeric body mount 21, as is the absorption of the operational loading between the frame 10 and the automotive component 19. Where noise or vibration transmission at any particular point on the frame 10 needs to be further dampened, a hydraulic body mount 31 can be added to the elastomeric body mount 21 to enhance vibrational control.

Referring to FIGS. 2-6, to mount the hydraulic body mount 31 to a chosen elastomeric, shear-type body mount 21, the hydraulic body mount 31 is positioned such that the connecting member 32 becomes engaged with the threaded lower end of the attachment bolt 25 extending below the bolt head or nut 29. The rigid connecting member 32 is first threaded onto the attachment bolt 25 until the mating threads in the connecting member 32 bottoms out either by the attachment bolt 25 reaching the bottom of the connecting member 32 or the connecting member 32 reaching the bottom of the nut or bolt head 29. The hydraulic body mount 31 is then compressed until the connection tabs 39 on the outer can 34 engage a mating slot 17, preferably in the form of a bayonet slot to facilitate the mounting of the hydraulic body mount 31, on a bridging can 16 attached to the offrigger bracket 15. The compression of the hydraulic body mount 31 forces most of the fluid within the lower chamber 37 through the central member 35 into the upper chamber 33.

In operation, the downward deflection of the attachment bolt 25 as described above with respect to the absorption of operational loads in the elastomeric body mount 21 is transferred to the connecting member 32 which, in turn, drives into the upper elastomeric chamber 33 and forces fluid to pass through the fluid orifice track 36 in the central member to pass into the lower chamber 37. Conversely, the upward deflection of the attachment bolt 25 and attached connecting member 32 draws the fluid from the lower chamber 37 back into the upper chamber 33. In either case, the compression against the fluid and the transfer thereof from one chamber 33, 37 to the other 37, 33, dampens the movement of the attachment bolt 25 and, thus, enhances the control of the vibration transmission. Accordingly, the elastomeric body mount 21 drives the operation of the hydraulic body mount 31 so that the damping characteristics of the hydraulic body mount 31 are supplemental, and in addition, to the dampening characteristics of the elastomeric body mount 21. Furthermore, the hydraulic body mount 31 does not bear any of the operational loads, which is borne by the elastomeric body mount 21.

A typical condition in which the body to frame mounting assembly 20 incorporating the principles of the instant invention can be utilized is in steering wheel vibrations that often occur at speeds in excess of 45 MPH. Vibrational issues perceived by the driver of the vehicle can be excited in two conditions: (1) on smooth road surfaces at 55 MPH in conjunction with a first order tire or wheel uniformity load; and (2) on semi-smooth road surfaces (e.g. village roads) at 25 MPH due to single or multiple wheel input from small undulations on the road surface. However, in some component offerings, the mass damper is not completely satisfactory in resolving all of these vibration issues.

To provide enough system level damping to address such vehicle vibration issues, the hydraulic body mount 31 can be added at the best locations. The main damping effect of the hydraulic body mount 31 is actually a leveraged mass absorber effect, due to viscous damping caused by the moving fluid, generating the same performance as a 40 to 80 pound conventional mass absorber. By adding the hydraulic body mount 31 to the conventional shear-type body mount 21 connecting the cab structure to the frame, the vibrations are no longer transmitted into the cab structure and felt by the driver due to the exciting of the seat track from the transmitted vibrations. The hydraulic body mount uses the movement of the existing conventional body mount 21 to drive the fluid in the attached hydraulic body mount 31 and dampens the vibrations otherwise being transmitted into the cab structure.

In practice, the application of a hydraulic body mount 31, as described above according to the principles of the instant invention, can be assembled into any selected vehicle configuration or provided as a service fix to address customer complaints relating to vibration issues, since the addition of the above-described hydraulic body mount 31 does not require any structural changes or component disassembly. Furthermore, the use of the hydraulic body mount 31 as described above avoids some of the pitfalls relating to failure of conventional utilization of hydraulic body mount devices, including high loading conditions, which is avoided due to the mounting of the hydraulic body mount 31 to an existing elastomeric body mount 21 instead of completely replacing the elastomeric body mount 21, and the size of the body mount and the interaction with the frame or body component does not require changing.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A secondary body to frame mounting assembly for mounting to a primary elastomeric body mount member interconnecting a first component to an offrigger bracket of a second component, the primary elastomeric body mount being operable to transfer operative loads between the first and second components comprising:

a hydraulic body mount having an upper chamber detachably and selectively connected to the primary elastomeric mount, a lower chamber, a rigid central member separating the upper and lower chambers, and an outer can having a connection member being detachably connected to the offrigger bracket of the second component, the offrigger bracket including a slot receiving the connection member to allow a selective attachment of the outer can to the offrigger bracket, the central member including a fixed channel formed therein with a first port in flow communication with the upper chamber and a second port radially spaced from the first port and being in flow communication with the lower chamber for the transfer of fluid between the upper and lower chambers to dampen the movement of the primary elastomeric body mount detachably connected to the upper chamber, the hydraulic body mount being operable to dampen the deflections of the primary elastomeric body mount, the slot on the offrigger bracket being formed as a bayonet slot to facilitate the attachment of the connection member thereto.

2. The body to frame mounting assembly of claim 1 wherein the upper chamber is formed with a first flexible elastomeric housing and a connecting member attached to the first flexible elastomeric housing, the connecting member being mounted on the primary elastomeric body mount.

3. The body to frame mounting assembly of claim 1 wherein the deflection of the primary elastomeric body mount drives the movement of the fluid between the upper and lower chambers through the channel in the central member in response to the application of the operative loads to the primary elastomeric body mount.

4. In an automotive vehicle having a frame formed with offrigger brackets, and a plurality of body components corresponding to the offrigger brackets to permit attachment of the body components to the frame, a primary elastomeric body mount disposed between the body component and the selected offrigger bracket, the improvement comprising:

a secondary hydraulic body mount detachably and selectively connected to the primary elastomeric body mount to supplement the deflection of the primary elastomeric body mount associated with the transfer of operational loads between the selected offrigger bracket and the corresponding body component, the secondary hydraulic body mount including an upper chamber, a lower chamber, and a central member disposed between the upper and lower chambers for a transfer of fluid therebetween through a channel formed in the central member and extending from a first port in flow communication with the upper chamber to a second port in flow communication with the lower chamber to define a circuitous flow path between the upper and lower chambers, the secondary hydraulic mount having a pair of connection tabs engagable with a pair of corresponding bayonet slots formed in the primary elastomeric body mount to permit a selective detachable connection of the secondary hydraulic mount to the primary elastomeric body mount.

5. The automotive vehicle of claim 4 wherein the upper chamber includes an elastomeric housing and a connecting member affixed to the elastomeric housing, the connecting member being engaged with the primary elastomeric body mount to transfer movement to the elastomeric housing.

6. A method of damping operational loads transferring through a primary elastomeric body mount between an automotive body component and a corresponding offrigger bracket of an automotive frame, the body component and the offrigger bracket being separated by elastomeric members within the elastomeric body mount, a fastener connecting the elastomeric body mount to the automotive body component and clamping the elastomeric body mount onto the offrigger bracket, comprising the step of:

selectively mounting an independent secondary hydraulic body mount to the primary elastomeric body mount to supplement the operation of the primary elastomeric body mount, the secondary hydraulic body mount including an upper chamber, a lower chamber, a central member disposed between the upper and lower chambers for a transfer of fluid therebetween through a channel formed in the central member, the mounting step including the step of detachably connecting a pair of connecting tabs projecting from the upper chamber to a corresponding pair of mating slots formed in the primary elastomeric body mount.

7. The method of claim 6 further comprising the step of:

driving the transfer of fluid within the secondary hydraulic body mount with the deflection of the primary elastomeric body mount connected to the upper chamber, corresponding to a transfer of operational loads between the body component and the offrigger bracket.

8. The method of claim 7 wherein the driving step includes the steps of:

transferring fluid in the secondary hydraulic body mount from an upper chamber through a port in a central member and into a lower chamber when the primary elastomeric body mount deflects relative to the offrigger bracket in response to a compression of the elastomeric body mount; and returning fluid from the lower chamber into the upper chamber through the port in the central member when the primary elastomeric body mount deflects relative to the offrigger bracket in response to the primary elastomeric body mount returning to a relaxed state from being compressed.

* * * * *